No. 795,838. PATENTED AUG. 1, 1905.
P. JIGOUZO.
ASYNCHRONOUS ELECTRIC MOTOR.
APPLICATION FILED DEC. 1, 1902.

2 SHEETS—SHEET 1.

WITNESSES.
Albert Jones
Herbert C. Bolwell

INVENTOR.
Paul Jigouzo
By his Attorneys.
Wheatley & MacKenzie

UNITED STATES PATENT OFFICE.

PAUL JIGOUZO, OF VANVES, FRANCE.

ASYNCHRONOUS ELECTRIC MOTOR.

No. 795,838. Specification of Letters Patent. Patented Aug. 1, 1905.

Application filed December 1, 1902. Serial No. 133,428.

*To all whom it may concern:*

Be it known that I, PAUL JIGOUZO, a citizen of the French Republic, residing at 5 Rue Jullien, Vanves, France, have invented certain new and useful Improvements in Asynchronous Electric Motors; and I do hereby declare the following to be a full, clear, and exact description of the invention, such as will enable others skilled in the art to which it appertains to make and use the same.

This invention relates to an asynchronous motor, preferably with squirrel-cage (or short-circuited) armature intended for working apparatus, such as roller-bridges, lifts, winches, elevators, centrifugal drying-machines, and the like. It relates also to the employment of these motors with power of control at a distance. The conditions to be fulfilled by such a motor are, first, starting under load without any sudden call upon the network of currents; second, normal working; third, instantaneous stoppage effected by electric braking.

In order that my invention may be understood, I make use of the accompanying drawings, in which—

Figure 1:
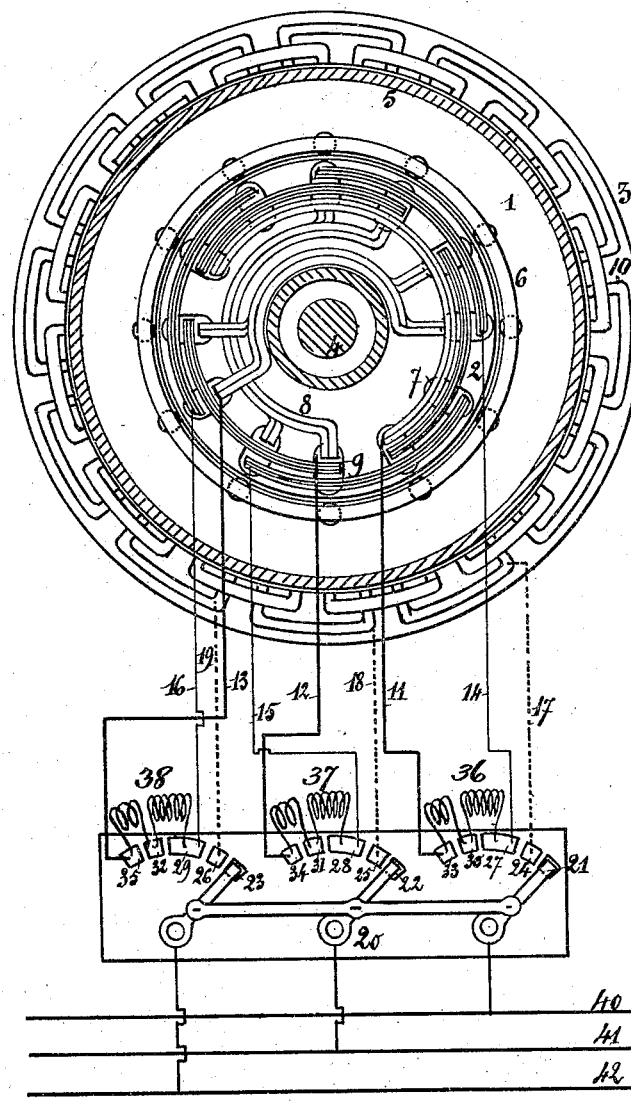
Figure 2:
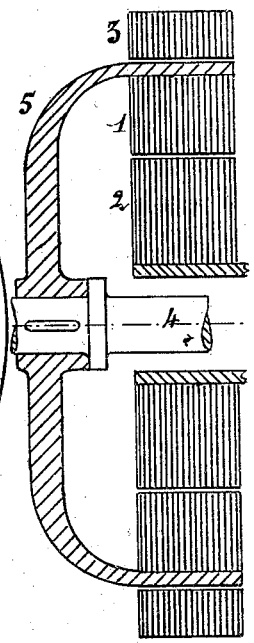
Figure 3:
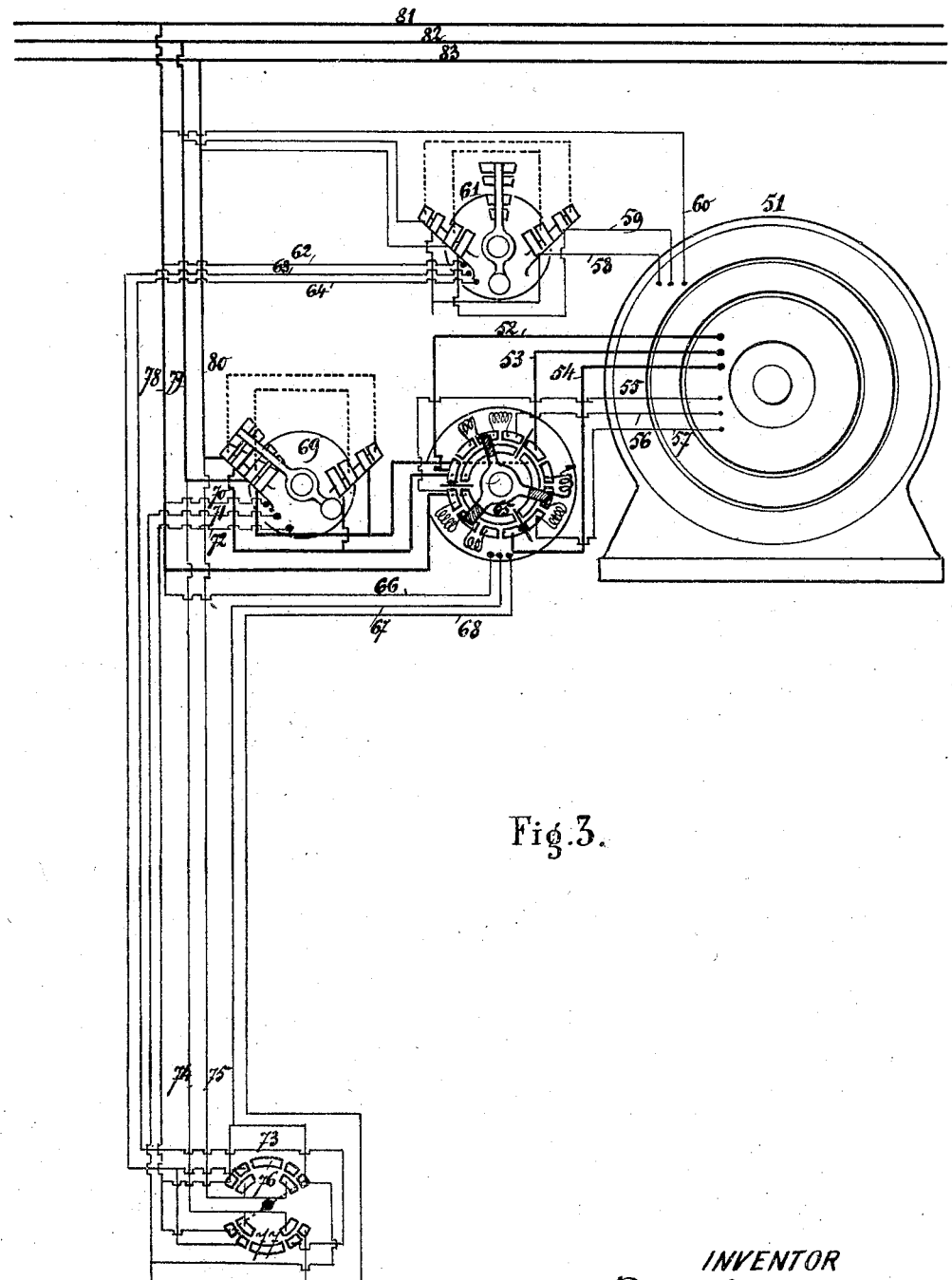

Figure 1 is an elevation of an asynchronous triphase motor; Fig. 2, a section. Fig. 3 represents the means of control at a distance of an asynchronous triphase motor.

1 is the movable squirrel-cage armature; 2, the fixed motor-inductor; 3, the fixed brake-inductor; 4, the shaft; 5, a bell keyed to the shaft and to which the armature is fixed.

6 is the squirrel-cage winding.

7 represents the notches of the inductor.

8 represents the normal winding of the inductor.

9 is the starting-coil; 10, the brake-coil.

11 12 13 are the leading-in wires for the introduction of the current to the normal coil.

14 15 16 are the leading-in wires for the introduction of current to the starting-coil.

17 18 19 are the leading-in wires for the introduction of current to the brake-coil.

20 is a controller for effecting control by hand.

21 22 23 are idle contact-pieces; 24 25 26, the brake contact-pieces; 27 28 29, the starting contact-pieces; 30 31 32, the intermediate contact-pieces; 33 34 35, the ordinary working contact-pieces; 36 37 38, the resistances; 40 41 42, the multiphase leads.

The motor comprises three concentric parts, one of which, 1, which is movable, constitutes the rotor or armature, keyed to the shaft, and moves between the other two fixed parts 2 and 3. The movable part or rotor is preferably a squirrel-cage or short-circuited armature, connected either to the exterior or the interior of a metallic bell 5, keyed to the shaft. The fixed part 2 is in the form of an ordinary inductor; but the notches have two windings, the one, 8, with conductors of normal section for the ordinary working with $p$ fields, the other, 9, with thinner conductors for the starting, with $n\, p$ fields. This latter has far more windings than the former 8, so as to reduce considerably the magnetizing-current. Notwithstanding this reduction of magnetizing-current the couple at starting may have sufficient value in regard to the increase in the number of fields and to the considerable slip, which is the function of this large number of windings. In these conditions by connecting this circuit 9 with the multiphase leads the starting may be effected slowly with a reduced current. In order to get speed, a change is made from the circuit 9 to the circuit 8, either suddenly or gradually, by introducing into 9 the resistances 36 37 38, which are withdrawn from 8. In fact, a third winding, with $m\, n\, p$ fields, may be added and be supplied with current in the first place for the starting, a change being then made to 9, finishing with 8. In this way speed will be obtained, varying within the widest limits.

The solid part of the bell moves in front of the third fixed part 3, which may either be solid or composed of thin plates, but furnished with a very large number of notches which receive a winding 10, forming a considerable number of $q\, p$ fields, $q$ being greater than $n$. If the motor having been started at a certain speed greater than that corresponding to the $q\, p$ fields the current from the inductor be cut off and this circuit 10 be supplied with current, intense Foucault (eddy) current will be generated in the solid bell and their energy, proportional to $\left(1 + \frac{9}{n}\right)^2$ being taken from the active force of the rotating mass the latter will stop more or less quickly, according to the value of the field created. The current taken from the multiphase circuit not serving to absorb this active force, but to create a field, is always weak. Moreover, if the part 3 be slightly excentred in relation to the part 1 the armature may be powerfully attracted toward it, and thus instantaneously arrested. This arrangement allows of the control at a distance of an asynchronous motor, as will be seen from Fig. 3, in which—

51 represents a triphase motor; 52 53 54, the conductors of current to the normal coil of the inductor; 55 56 57, the conductors of current to the starting-coil; 58 59 60, the conductors of current to the brake-coil.

61 is the commutating brake-motor, consisting of a very small triphase motor actuating in one direction or the other a series of contact-pieces under the action of the current transmitted through the key or manipulator. 62 63 64 are the conductors of current to the motor of this commutator or reversing device.

65 is a starting-motor, consisting of a very small motor rotating very slowly in a direct sense and then instantaneously in the reverse direction. It actuates the commutator, (similar to that of the means of control by hand,) rendering possible a change at a distance from the starting-coil to the ordinary working coil under the action of the manipulator. 66 67 68 are the conductors of current to the motor of this starting device.

69 is a motor commutating the coils, consisting of a very small triphase motor, enabling the motor 51 to run to the left or the right under the action of the current transmitted through the manipulator. 70 71 72 are the conductors of current to the motor of this commutator. 73 is the manipulator whereby according to the position of the switch the motor 51 may be turned to right or left and the brake action applied in both cases. 74 75 are the wires inducing two of the phases in this commutator.

76 77 are the idle contact-pieces of the manipulator.

78 79 80 are the conductors of current to the starting device, two of which run through the commutator.

81 82 83 are the cables of the multiphase leads.

What I claim is—

1. In a motor of the character described, the combination with a rotatable armature, of a fixed motor-inductor and a fixed brake-inductor, between which inductors the armature is arranged, the said motor-inductor having notches, two windings 8 and 9 in said notches, substantially as described, and a winding 10 carried by the fixed brake-inductor.

2. In a motor of the character described, the combination with a rotatable armature, of a fixed motor-inductor and a fixed brake-inductor, between which inductors the armature is arranged, the said motor-inductor having notches, two windings 8 and 9 in said notches, substantially as described, and a winding 10 carried by the fixed brake-conductor, the controller, the multiphase leads, the leading-in wires 11, 12, 13 for introduction of current to the winding 8, the leading-in wires 14, 15, 16 for introduction of current to the coil 9, the leading-in wires 17, 18, 19 for introduction of current to the winding 10, the contact-pieces 21 to 35, and the resistances 36, 37 and 38, all arranged substantially as and for the purpose specified.

In testimony whereof I have affixed my signature in presence of two witnesses.

PAUL JIGOUZO.

Witnesses:
CHARLES FABER,
EDOUARD HEYWARD.